US011468289B2

(12) United States Patent
Cao et al.

(10) Patent No.: US 11,468,289 B2
(45) Date of Patent: Oct. 11, 2022

(54) HYBRID QUANTUM-CLASSICAL ADVERSARIAL GENERATOR

(71) Applicant: Zapata Computing, Inc., Bosston, MA (US)

(72) Inventors: Yudong Cao, Cambridge, MA (US); Jonathan P. Olson, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 0 days.

(21) Appl. No.: 17/174,900

(22) Filed: Feb. 12, 2021

(65) Prior Publication Data

US 2021/0256351 A1    Aug. 19, 2021

Related U.S. Application Data

(60) Provisional application No. 62/975,996, filed on Feb. 13, 2020.

(51) Int. Cl.
*G06N 3/04* (2006.01)
*G06N 10/00* (2022.01)

(52) U.S. Cl.
CPC ......... *G06N 3/0445* (2013.01); *G06N 3/0472* (2013.01); *G06N 10/00* (2019.01)

(58) Field of Classification Search
CPC ..... G06N 10/00; G06N 3/0445; G06N 3/0472
See application file for complete search history.

(56) References Cited

U.S. PATENT DOCUMENTS

| 9,663,358 B1 | 5/2017 | Cory et al. |
| 2007/0239366 A1 | 10/2007 | Hilton |

(Continued)

FOREIGN PATENT DOCUMENTS

| KR | 101822326 B1 | 12/2016 |
| KR | 20160147988 A | 12/2016 |

(Continued)

OTHER PUBLICATIONS

Dallaire-Demers et al., "Quantum generative adversarial networks", Jul. 23, 2018, Physical Review A 98, 012324, pp. 1-8. (Year: 2018).*

(Continued)

*Primary Examiner* — Brent Johnston Hoover
(74) *Attorney, Agent, or Firm* — Blueshift IP, LLC; Robert Plotkin

(57) ABSTRACT

A method for training an adversarial generator from a data set and a classifier includes: (A) training a classical noise generator whose input includes an output of a quantum generator, the classical noise generator having a first set of parameters, the training comprising: sampling from the data set to produce a first sample and a first corresponding label for the first sample; producing an output of the classical noise generator based on the output of the quantum generator and the first sample; producing a noisy example based on the output of the classical noise generator and the first sample; providing the noisy example to the classifier to produce a second corresponding label for the first sample; updating the first set of parameters such that the first corresponding label of the first sample differs from the second corresponding label of the first sample.

10 Claims, 6 Drawing Sheets

(56) References Cited

U.S. PATENT DOCUMENTS

| | | | |
|---|---|---|---|
| 2007/0288684 | A1 | 12/2007 | Bergou |
| 2015/0032994 | A1 | 1/2015 | Chudak |
| 2015/0317558 | A1 | 11/2015 | Adachi |
| 2016/0328253 | A1 | 11/2016 | Majumdar |
| 2017/0223094 | A1 | 8/2017 | Johnson |
| 2017/0364796 | A1 | 12/2017 | Wiebe |
| 2018/0165601 | A1 | 6/2018 | Wiebe et al. |
| 2018/0247200 | A1 | 8/2018 | Rolfe |
| 2019/0197358 | A1* | 6/2019 | Madani ............... G06N 3/0481 |
| 2019/0213495 | A1 | 7/2019 | Babbush |
| 2019/0393399 | A1 | 12/2019 | Leipold |
| 2020/0057957 | A1 | 2/2020 | Johnson |
| 2020/0118025 | A1 | 4/2020 | Romero |
| 2020/0134502 | A1 | 4/2020 | Anschuetz et al. |
| 2020/0394537 | A1 | 12/2020 | Wang |
| 2020/0410384 | A1* | 12/2020 | Aspuru-Guzik ......... G06N 7/08 |

FOREIGN PATENT DOCUMENTS

| | | | |
|---|---|---|---|
| WO | 2017066695 | A1 | 4/2017 |
| WO | 2019032103 | A1 | 2/2019 |
| WO | 2019077240 | A1 | 4/2019 |
| WO | 2019177951 | A1 | 9/2019 |
| WO | 2020037253 | A1 | 2/2020 |
| WO | 2020077288 | A1 | 4/2020 |
| WO | 2020086867 | A1 | 4/2020 |
| WO | 2020077288 | A9 | 3/2021 |
| WO | 2021102344 | A1 | 5/2021 |
| WO | 2021163487 | A1 | 8/2021 |
| WO | 2021247125 | A2 | 12/2021 |

OTHER PUBLICATIONS

Bergholm et al., "PennyLane: Automatic differentiation of hybrid quantum-classical computations", Feb. 20, 2019, arXiv: 1811.04968v2, pp. 1-12. (Year: 2019).*

Ackley, D.H., et al., "A Learning Algorithm for Boltzmann Machines", Cognitive Science, vol. 9, No. 1, pp. 147-169 (1985).

Amin, M.H., et al., "Quantum Boltzmann Machine", Phys. Rev. X 8, 021050 URL:https://arxiv.org/abs/1601.02036, vol. 8, No. 2, pp. 1-10 (Jan. 8, 2016).

Amin, M.H., et al., "Quantum Boltzmann Machine", Physical Review X, vol. 8, No. 1, Available online https://journals.aps.org/prx/abstract/10.1103/PhysRevX.8.021050, pp. 021050-1-021050-11 (May 23, 2018).

Anschuetz, E.R., and Zanoci, C., "Near-Term Quantum-Classical Associative Adversarial Networks", Phys. Rev. A, URL: https://arxiv.org/abs/1905.13205, vol. 100, No. 5, 052327, pp. 1-11 (2019).

Barahona, F., "On the computational complexity of Ising spin glass models", Journal of Physics A: Mathematical and General, vol. 15, No. 10, pp. 3241-3253 (1982).

Benedetti, M., et al., "Estimation of effective temperatures in quantum annealers for sampling applications: A case study with possible applications in deep learning", Phys. Rev. A, vol. 94, No. 2, 022308, pp. 1-15 (Aug. 9, 2016).

Biamonte, J.D., et al., "Realizable Hamiltonians for universal adiabatic quantum computers", Phys. Rev. A, vol. 78, No. 1, 012352, pp. 1-7 (2008).

D'Alessio, L., et al., "From quantum chaos and eigenstate thermalization to statistical mechanics and thermodynamics", Advances in Physics, vol. 65, No. 3, pp. 1-130 (2016).

Deutsch, J.M., "Quantum statistical mechanics in a closed system", Phys. Rev. A, vol. 43, No. 4, pp. 2046-2049 (Feb. 15, 1991).

Garcia-Saez, A., et al., "Local Temperature in Quantum Thermal States", vol. 79, No. 5, arXiv: 0808.0102v2, pp. 1-10 (02 Jun. 2, 2009).

Garrison, J.R., et al., "Does a Single Eigenstate Encode the Full Hamiltonian?" Physical Review X, vol. 8, No. 2, pp. 021026-1-021026-24 (2018).

International Search Report and Written Opinion dated Feb. 10, 2020 in International patent application No. PCT/US2019/057893, 7 pages.

Kaufman, A.M., et al., "Quantum thermalization through entanglement in an isolated many-body system", Science, vol. 353, No. 6301, pp. 794-800 (Aug. 19, 2016) DOI: 10.1126/science.aaf6725.

Kiefer, J., et al., "Stochastic Estimation of the Maximum of a Regression Function", Ann. Math. Statist. vol. 23, No. 3, pp. 462-466 (1952).

Kieferova, M., et al, "Tomography and generative training with quantum Boltzmann machines", Phys. Rev. A, vol. 96, No. 6. 062327, pp. 1-2 (Dec. 22, 2017) (Abstract).

Mandra, S., et al., "Strengths and weaknesses of weak-strong cluster problems: A detailed overview of state-of-the-art classical heuristics versus quantum approaches", Phys. Rev. A, vol. 94, No. 6, 022337, pp. 1-14 (Aug. 29, 2016).

Preskill, J., "Quantum Computing in the NISQ era and beyond", pp. 1-20, (Jul. 31, 2018).

Spall, J.C., "A Stochastic Approximation Technique for Generating Maximum Likelihood Parameter Estimates", in 1987 American Control Conference, pp. 1161-1167 (1987).

Srednicki, M., "Chaos and quantum thermalization", Phys. Rev. E, vol. 50, No. 2, 888, pp. 1-30 (Aug. 1, 1994).

Verdon, G., et al., "A quantum algorithm to train neural networks using low-depth circuits", Quantum Physics, arXiv:1712.05304 [quant-ph], pp. 1-9 (Dec. 14, 2017).

Besnier, V., et al., "This Dataset Does Not Exist: Training Models From Generated Images", Cornell University, pp. 1-6 (Nov. 7, 2019) Available online at [https://arxiv.org/abs/1911.02888].

Dallaire-Demers, P.L., et al., "Quantum Generative Adversarial Networks," Physical Review A, vol. 98, No. 1, p. 012324, pp. 1-10 (Apr. 2018).

He, Z., et al., "A Conditional Generative Model Based on Quantum Circuit and Classical Optimization", International Journal of Theoretical Physics, vol. 58, pp. 1138-1149 (2019).

International Search Report and Written Opinion dated Jun. 7, 2021, in international patent application No. PCT/US2021/017863, 7 pages.

Kaneko, T., and Harada, T., "Noise Robust Generative Adversarial Networks", Cornell University, pp. 1-29, Nov. 26, 2019. Available online at [https://arxiv.org/abs/1911.11776v1].

Roth, R. M., et al., "Apathy Is Associated with Ventral Striatum Volume in Schizophrenia Spectrum Disorder", J Neuropsychiatry Clin Neurosci, 2016 Summe, vol. 28, No. 3, pp. 1-9 (Published online Feb. 22, 2016. doi: 10.1176/appi.neuropsych.15100241).

Endo, S., et al., "Practical Quantum Error Mitigation for Near-Future Applications", Phys. Rev. X, vol. 8, 031027-1-031027-21 (2018).

Kandala, A., et al., "Extending the computational reach of a noisy superconducting quantum processor", arXiv preprint arXiv:1805.04492v1, pp. 1-10 (2018).

Bengio, Y., et al., "Greedy layer-wise training of deep networks", NIPS'06: Proceedings of the 19th International Conference on Neural Information Processing Systems, pp. 1-8 (Dec. 2006).

He, K., et al., "Deep Residual Learning for Image Recognition", Proceedings of the IEEE conference on computer vision and pattern recognition, pp. 770-778 (2016).

Valiant, L. G., "Quantum computers that Can Be Simulated Classically in Polynomial Time", SIAM Journal on Computing, vol. 31, No. 4, pp. 1-10 (2002).

Cirq, https://github.com/quantumlib/Cirq, Available online, copyright 2019, 2 pages.

Quantum Information Software Kit (QISKit), https://qiskit.org/ (2018).

Steiger, D. S., et al., "ProjectQ: An Open Source Software Framework for Quantum Computing", Quantum, arXiv:1612.08091v2, vol. 2, pp. 1-13 (2016).

Abadi, M., et al., "TensorFlow: Large-Scale Machine Learning on Heterogeneous Distributed Systems", pp. 1-19 (Preliminary White Paper, Nov. 9, 2015), software available from tensorflow.org, http://tensorflow.org/.

(56) References Cited

OTHER PUBLICATIONS

Dankert, C., et al., "Exact and approximate unitary 2-designs and their application to fidelity estimation", Physical Review A, vol. 80, No. 1, Jan. 23, 2004, pp. 1-7 (Jul. 2009).
Temme, K., et al., "Error Mitigation for Short-Depth Quantum Circuits", Physical review letters, vol. 119, No. 18, 180509, pp. 1-15 (2017).
Eric R. Anschuetz et al., "Realizing Quantum Boltzmann Machines Through Eigenstate Thermalization," arXiv preprint, arXiv:1903.01359 [quant-ph], Mar. 4, 2019, 30 pages. Available online at https://arxiv.org/abs/1903.01359.
Preskill, J., "Quantum Computing in the NISQ era and beyond", arXiv preprint arXiv:1801.00862v3, pp. 1-20 (Jul. 31, 2018).
Wan, K. H., et al., "Quantum generalisation of feedforward neural networks", npj Quantum Information, vol. 3, Article No. 36, arXiv:1612.01045, pp. 1-8 (2017).
McClean, J. R., et al., "The theory of variational hybrid quantum-classical algorithms", New Journal of Physics, vol. 18, pp. 1-22 (Feb. 5, 2016).
Romero et al., "Quantum autoencoders for efficient compression of quantum data", arXiv:1612.02806v2, Feb. 10, 2017, 11 pages. . [retrieved on Jan. 20, 2020]. Retrieved from <https://arxv.org/abs/1612.02806>.
International Search Report and Written Opinion dated Feb. 4, 2020, in International Patent Application No. PCT/US2019/055970, 11 pages.
McClean, J. R., et al., "Barren plateaus in quantum neural network training landscapes", Nature Communications, vol. 9, pp. 1-6, 2018.
Dallaire-Demers, P.L., et al., "Low-depth circuit ansatz for preparing correlated fermionic states on a quantum computer", Quantum Physics, arXiv:1801.01053v1, pp. 1-15 (Jan. 3, 2018).
Benedetti, M., et al., "Quantum-assisted Helmholtz machines: A quantum-classical deep learning framework for industrial datasets in near-term devices", Quantum Physics, ArXiv 1708.09784v3, pp. 1-11 (Mar. 19, 2018).
Goodfellow, I. J., et al., "Generative Adversarial Networks", arXiv:1406.2661v1 [stat.ML], 2014, pp. 1-9 (Jun. 10, 2014).
Rolfe, J.T., "Discrete Variational Autoencoders", ICLR, pp. 1-33 (Apr. 22, 2017).
Romero, J., et al., "Strategies for quantum computing molecular energies using the unitary coupled cluster ansatz", arXiv:1701.02691v2 [quant-ph], vol. 4, No. 4, pp. 1-18 (Feb. 10, 2018).
Mitarai, K., et al., "Quantum Circuit Learning", Phys. Rev. A 98, 032309, DOI:10.1103/PhysRevA.98.032309, arXiv:1803.00745 [quant-ph], pp. 1-7 (2019).
Huggins, W., et al., "Towards quantum machine learning with tensor networks", Quantum Science and Technology, arXiv:1803.1153v2, vol. 4, No. 2, pp. 1-12 (Jul. 31, 2018).
Romero, J., and Aspuru-Guzik, A., "Variational quantum generators: Generative adversarial quantum machine learning for continuous distributions", Quantum Physics, arXiv:1901.00848 [quant-ph], pp. 1-15 (Jan. 3, 2019).
Schuld, M., et al., "Quantum machine learning in feature Hilbert spaces", Quantum Physics, arXiv:1803.07128, pp. 1-12 (Mar. 19, 2018).
Schlittgen, B., et al., "Low-Energy Effective Theories of Quantum Spin and Quantum Link Models", Physical Review D, vol. 63. No. 8, pp. 1-29 (Mar. 19, 2001).
International Search Report and Written Opinion dated Dec. 6, 2019 in PCT International Patent Application No. PCT/US2019/046895, 9 pages.
Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/1501.02813>.
Purvis, G.D., et al., "A full coupled-cluster singles and doubles model: The inclusion of disconnected triples", The Journal of Chemical Physics, vol. 76, No. 4, pp. 1910-1918 (Feb. 15, 1982).
Chiles, R.A., et al., "An electron pair operator approach to coupled cluster wave functions, application to He2, Be2, and Mg2 and comparison with CEPA methods", The Journal of Chemical Physics, vol. 74, No. 8, pp. 4544-4556 (1981).
Handy, N.C., et al., "Size-consistent Brueckner theory limited to double substitutions", Chemical Physics Letters, vol. 164, No. 2-3, pp. 185-192 (Dec. 8, 1989).
Liu, Y., et al., "Quantum computational complexity of the N-representability problem: QMA complete", Physical review letters, vol. 98, No. 11, pp. 1-6 (2007).
Liu, Y., "The Complexity of the Consistency and N-Representability Problems for Quantum States", Quantum Physics, arXiv preprint arXiv:0712.3041, pp. 1-89 (2007).
Aspuru-Guzik, A., et al., "Simulated Quantum Computation of Molecular Energies", Science, Quantum Physics, vol. 309, No. 5741, pp. 1-21 (Sep. 9, 2005).
Endo, S., et al., "Variational quantum algorithms for discovering Hamiltonian spectra", Physical Review A, arXiv preprint arXiv:1806.05707, pp. 1-9 (2018).
Goemans, M.X., et al., "Improved Approximation Algorithms for Maximum Cut and Satisfiability Problems Using Semidefinite Programming", Journal of the ACM (JACM), vol. 42, No. 6, pp. 1115-1145 (Nov. 1995).
Bogoljubov, N.N., "A New Method in the Theory of Superconductivity", Soviet Physics JETP, vol. 34, No. 7, pp. 41-46 (Jul. 1958).
Bach, V., et al., "Generalized Hartree-Fock Theory and the Hubbard Model", Journal of Statistical Physics, vol. 76 (1-2):3-89, pp. 1-68 (Nov. 25, 1993).
Bravyi, L. D., et al., "Fermionic Quantum Computation", Annals of Physics, vol. 298, No. 1, pp. 210-226 (2002).
McClean, J.R., et al., "Hybrid Quantum-Classical Hierarchy for Mitigation of Decoherence and Determination of Excited States", Physical Review A, vol. 95, No. 4, pp. 1-10 (2017).
Colless, J.I., et al., "Computation of Molecular Spectra on a Quantum Processor with an Error-Resilient Algorithm", Physical Review X, vol. 8, No. 1, pp. 011021-011027 (2018).
Rubin, N. C., et al., "Application of Fermionic Marginal Constraints to Hybrid Quantum Algorithms", New Journal of Physics, vol. 20, No. 5, 053020, pp. 1-21 (2018).
Wecker, D., et al., "Towards Practical Quantum Variational Algorithms", Physical Review A, vol. 92, No. 4, 042303, pp. 1-11 (2015).
Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).
Johnson, P. D., et al., "A Method for Improving Quantum Optimization Algorithms: The Marginals Optimization Procedure", ICE 5th Conference on Quantum Information, Spain, (May 28-31, 2019), Book of Abstracts p. 59.
Wecker, D., et al., "Solving strongly correlated electron models on a quantum computer", Physical Review A, vol. 92, No. 6, pp. 1-27 (2015).
Jordan, P., et al., "In The Collected Works of Eugene Paul Wigner: Part A: The Scientific Papers—Chapter: Über das Paulische Äquivalenzverbot", pp. 109-129. Springer (1993).
Bonet-Monroig, "Comparison of Error itigation Strategies in a Hydrogen Molecule Quantum Simulation", Master thesis. Leiden University, pp. 1-52 (May 29, 2018).
Rubin, N.C., "A Hybrid Classical/Quantum Approach for Large-Scale Studies of Quantum Systems with Density Matrix Embedding Theory", Quantum Physics, arXiv:1610.06910 [quant-ph], pp. 1-10, (2016).
Reiher, M., et al., "Elucidating Reaction Mechanisms on Quantum Computers", PNAS, vol. 114, No. 29, pp. 1-28 (2016).
Motta, M., et al., "Low rank representations for quantum simulation of electronic structure", Computational Physics, Quantum Physics, arXiv:1808.02625v2, pp. 1-8 (Aug. 9, 2018).
Extended European Search Report dated Dec. 7, 2021, in European patent application 19871859.5, 14 pages.
Extended European Search Report dated Dec. 7, 2021, in European patent application 19874946.7, 11 pages.
Yi-Zhuang You et al., "Machine learning spatial geometry from entanglement features," Phys. Rev. B 97, 045153, Jan. 31, 2018, 15 pages.

(56) References Cited

OTHER PUBLICATIONS

Damian S. Steiger et al., "Advantages of a modular high-level quantum programming framework," arXiv: 1806.01861, Jun. 2018, 11 pages. Available online at: https://arxiv.org/abs/1806.01861.

Peng Zhao et al., "High-contrast ZZ interaction using superconducting qubits with opposite-sign anharmonicity," arXiv:2002.07560v2, Feb. 2020, 16 pages. Available online at: https://arxiv.org/abs/2002.07560.

International Search Report & Written Opinion dated Jan. 14, 2022, in international patent application No. PCT/US2021/024308, 7 pages.

Aliakbar Panahi et al., "word2ket: Space-efficient Word Embeddings inspired by Quantum Entanglement," International Conference on Learning Representations 2020, Mar. 3, 2020, arXiv:1911.04975, 10 pages.

Brassard, G., et al., "Quantum Amplitude Amplification and Estimation", arXiv:quant-ph/0005055v1, pp. 1-22 (May 15, 2000).

Wang, D., et al., "Accelerated Variational Quantum Eigensolver", arXiv:1802.00171v3, pp. 1-11 (Mar. 25, 2019).

Guillaume Verdon et al., "Quantum Hamiltonian-Based Models and the Variational Quantum Thermalizer Algorithm," Quantum Physics, arXiv:1910.02071, Oct. 4, 2019, 21 pages.

Seth Lloyd et al., "Quantum embeddings for machine learning," https://arxiv.org/abs/2001.03622, Feb. 10, 2020, 11 pages.

Wang, G., et al., "Minimizing Estimation Runtime on Noisy Quantum Computers," PRX Quantum 2.1 pp. 010346-1-49 (2021).

International Search Report & Written Opinion dated Mar. 29, 2022, in international patent application No. PCT/US2022/012227, 6 pages.

Peruzzo, A., et al., "A variational eigenvalue solver on a photonic quantum processor", Nature Communications, vol. 5, Article No. 4213, pp. 1-7 (2014).

Farhi, E., et al., "A quantum approximate optimization algorithm", Quantum Physics, arXiv1411.4028v1, pp. 1-16 (Nov. 14, 2014).

Shor, P. W., "Algorithms for quantum computation: Discrete logarithms and factoring", Proceedings 35th Annual Symposium on Foundations of Computer Science (Shafi Goldwasser, ed.), IEEE, pp. 124-134 (1994).

Lloyd, S., "Universal Quantum Simulators", Science, vol. 273, No. 5278, pp. 1073-1078 (Aug. 23, 1996).

Wendin, G., "Quantum information processing with superconducting circuits: a review", Reports on Progress in Physics, vol. 80, No. 10, pp. 108 (2017).

Aaronson, S., and Chen, L., "Complexity-Theoretic Foundations of Quantum Supremacy Experiments", arXiv:1612.05903v2, pp. 1-66 (Dec. 26, 2016).

Boixo, S., et al., "Characterizing Quantum Supremacy in Near-Term Devices", Nature Physics, vol. 14, pp. 595-600 (2018).

Johnson, P. D., et al., "QVECTOR: an algorithm for device-tailored quantum error correction", arXiv preprint arXiv:1711.02249v1, pp. 1-16 (Nov. 7, 2017).

Cao, Y., et al., "Quantum Neuron: an elementary building block for machine learning on quantum computers", arXiv:1711.11240v1, pp. 1-30 (2017).

Havlicek, V., et al., "Supervised learning with quantum enhanced feature spaces", arXiv:1804.11326v2, pp. 1-22 (Jun. 5, 2018).

Schuld, M., et al., "Circuit-centric quantum classifiers", arXiv:1804.00633v1, pp. 1-17 (Apr. 2, 2018).

Farhi, E., and Neven, H., "Classification with Quantum Neural Networks on Near Term Processors", arXiv preprint arXiv:1802.06002v2, pp. 1-21 (Aug. 30, 2018).

Grant, E., et al., "Hierarchical quantum classifiers", npj Quantum Information, vol. 4, Article No. 65 ISSN 2056-6387, pp. 1-8 (2018).

Chen, H., et al., "Universal discriminative quantum neural networks", arXiv preprint arXiv:1805.08654v1, pp. 1-19 (May 22, 2018).

Sim, S., et al., "A framework for algorithm deployment on cloud-based quantum computers", arXiv preprint arXiv:1810.10576v1, pp. 1-10 (Oct. 24, 2018).

Perdomo-Ortiz, A., et al., "Opportunities and challenges for quantum-assisted machine learning in near-term quantum computers", Quantum Science and Technology, vol. 3, No. 3, pp. 1-14 (2018).

Benedetti, M., et al., "A generative modeling approach for benchmarking and training shallow quantum circuits", arXiv preprint arXiv:1801.07686v4, pp. 1-16 (Jun. 2, 2019).

Zeng, J., et al., "Learning and Inference on Generative Adversarial Quantum Circuits", arXiv preprint arXiv:1808.03425v1, pp. 1-7 (2018).

Situ, H., et al., "Quantum generative adversarial network for discrete data", arXiv preprint arXiv:1807.01235v5, pp. 1-22 (2019).

Liu, J., and Wang, L., "Differentiable learning of quantum circuit Born machines", Phys. Rev. A 98, 062324, pp. 1-9 (2018).

Goodfellow, I. J., et al., "Generative adversarial nets", in Advances in neural information processing systems, pp. 1-9 (2014).

Lloyd, S., and Weedbrook, C., "Quantum Generative Adversarial Learning", Phys. Rev. Lett. vol. 121, No. 4, pp. 040502-1-040502-5 (2018).

Baydin, A. G., et al., "Automatic Differentiation in Machine Learning: a Survey", Journal of Machine Learning Research, vol. 18, No. 1, pp. 1-43 (2018).

Bergholm, V., et al., "PennyLane: Automatic differentiation of hybrid quantumclassical computations", arXiv preprint arXiv:1811.04968v3, pp. 1-15 (2018).

Goodfellow, I., "NIPS 2016 Tutorial: Generative Adversarial Networks", arXiv preprint arXiv:1701.00160v4, pp. 1-57 (2016).

Radford, A., et al., "Unsupervised Representation Learning with Deep Convolutional Generative Adversarial Networks", arXiv preprint arXiv:1511.06434, pp. 1-16 (2015).

Creswell, A., et al., "Generative Adversarial Networks: An Overview", IEEE Signal Processing Magazine, vol. 35, No. 1, pp. 1-14 (2017).

Gómez-Bombarelli, R., et al., "Automatic Chemical Design Using a Data-Driven Continuous Representation of Molecules", ACS Cent. Sci., vol. 4, No. 2, pp. 268-276 (2018).

Aspuru-Guzik, A., et al., "The Matter Simulation (R)evolution", ACS Cent. Sci., 4, 2, pp. 144-152 (2018).

Guimaraes, G., et al., "Objective-Reinforced Generative Adversarial Networks (ORGAN) for Sequence Generation Models", arXiv preprint arXiv:1705.10843v3, pp. 1-7 (2018).

Sanchez-Lengeling, B., and Aspuru-Guzik, A., "Inverse molecular design using machine learning: Generative models for matter engineering", Science 27, vol. 361, No. 6400, pp. 360-365 (Jul. 27, 2018).

Sanchez-Lengeling, B., et al., "Optimizing distributions over molecular space. An Objective-Reinforced Generative Adversarial Network for Inverse-design Chemistry (ORGANIC)", ChemRxiv preprint chemrxiv.5309668.v2, pp. 1-20 (2017).

Kadurin, A., et al., "druGAN: An Advanced Generative Adversarial Autoencoder Model for de Novo Generation of New Molecules with Desired Molecular Properties in Silico," Molecular Pharmaceutics 2017, vol. 14, 9, pp. 3098-3104 (Jul. 13, 2017) (Abstract).

Dallaire-Demers, P. L., and Killoran, N., "Quantum generative adversarial networks", arXiv:1804.08641v2, Phys. Rev. A, vol. 98, 012324, pp. 1-10 (Apr. 30, 2018).

Zeng, J., et al., "Learning and Inference on Generative Adversarial Quantum Circuits", arXiv preprint arXiv:1808.02893, vol. 99, No. 5, pp. 1-7 (2018).

Grover, L., and Rudolph, T., et al., "Creating superpositions that correspond to efficiently integrable probability distributions", arXiv preprint quantph/0208112v1, pp. 1-2 (2002).

Soklakov, A. N., and Schack, R., "Efficient state preparation for a register of quantum bits", Phys. Rev. A, 012307, arXiv:quant-ph/0408045v2, vol. 73, No. 1, pp. 1-26 (Nov. 22, 2005).

M. Plesch, M., and Brukner, C., "Quantum-State Preparation with Universal Gate Decompositions", Phys. Rev. A 83, arXiv:1003.5760v2, 032302, pp. 1-5 (Mar. 4, 2011).

Niemann, P., et al., "Logic Synthesis for Quantum State Generation", 2016 IEEE 46th International Symposium on Multiple-Valued Logic (ISMVL), Sapporo, pp. 247-252 (2016).

Biamonte, J., et al., "Quantum machine learning", Nature 549, pp. 195-292 (2016).

(56) References Cited

OTHER PUBLICATIONS

Du, Y., et al., "The Expressive Power of Parameterized Quantum Circuits", arXiv preprint arXiv:1810.11922V1, pp. 1-15 (2018).
Wecker, D., et al., "Progress towards practical quantum variational algorithms", Phys. Rev. A 92, 042303, pp. 1-11 (2015).
Spall, J. C., "Adaptive stochastic approximation by the simultaneous perturbation method", IEEE Transactions on Automatic Control, vol. 45, No. 10, pp. 1839-1853 (Oct. 2000).
Spall, J. C., "A one-measurement form of simultaneous perturbation stochastic approximation", Automatica, vol. 33, No. pp. 109-112 (1997).
Goodfellow, I., et al., "Deep Learning", Book, vol. 1 (MIT press Cambridge, 2016) available online at http://www.deeplearningbook.org, pp. 1-798.
Kandala, A., et al., "Hardware-efficient Variational Quantum Eigensolver for Small Molecules and Quantum Magnets", Nature, vol. 549, pp. 1-24 (2017).
Schuld, M., et al., "Evaluating analytic gradients on quantum hardware", arXiv preprint arXiv:1811.11184v1, pp. 1-8 (2018).
Smith, R. S., et al., "A Practical Quantum Instruction Set Architecture", arXiv preprint arXiv:1608.03355v2, pp. 1-15 (2016).
Paszke, A., et al., "Automatic differentiation in PyTorch", 31st Conference on Neural Information Processing Systems Long Beach, CA, USA, pp. 1-4 (NIPS 2017).
Mescheder, L., et al., "Which Training Methods for GANs do actually Converge?", International Conference on Machine Learning, pp. 1-39 (2018).

\* cited by examiner

HYBRID QUANTUM-CLASSICAL ADVERSARIAL GENERATOR

CROSS-REFERENCE TO RELATED APPLICATIONS

This application incorporates by reference herein U.S. patent application Ser. No. 16/662,895, filed on Oct. 24, 2019, entitled, "Hybrid Quantum-Classical Computer System for Implementing and Optimizing Quantum Boltzmann Machines."

BACKGROUND

Artificial intelligence (AI) and machine learning (ML) are becoming increasingly prevalent in critical industries. These technologies have incredible impact, allowing automation of tasks that previously required significant human effort and enabling new, otherwise impossible tasks. As new capabilities are added, however, new vulnerabilities also materialize. Remarkably, many important AI functions—such as those designed for image recognition—exhibit almost universal vulnerability to attacks from adversarial AI.

The primary mechanism for adversarial AI to produce errors in the target is through generation of adversarial examples. These examples are generated by a reverse-engineering of either the target (a "white-box attack"), or an AI system which is trained by the attacker to do the same job as the target (a "black-box" attack). In supervised learning, for instance, the adversarial example is created by manipulating a known input and label such that the input is optimized to give the nearest misclassification.

SUMMARY

A method for training an adversarial generator from a data set and a classifier includes: (A) training a classical noise generator whose input includes an output of a quantum generator, the classical noise generator having a first set of parameters, the training comprising: sampling from the data set to produce a first sample and a first corresponding label for the first sample; producing an output of the classical noise generator based on the output of the quantum generator and the first sample; producing a noisy example based on the output of the classical noise generator and the first sample; providing the noisy example to the classifier to produce a second corresponding label for the first sample; updating the first set of parameters such that the first corresponding label of the sample differs from the second corresponding label of the first sample.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
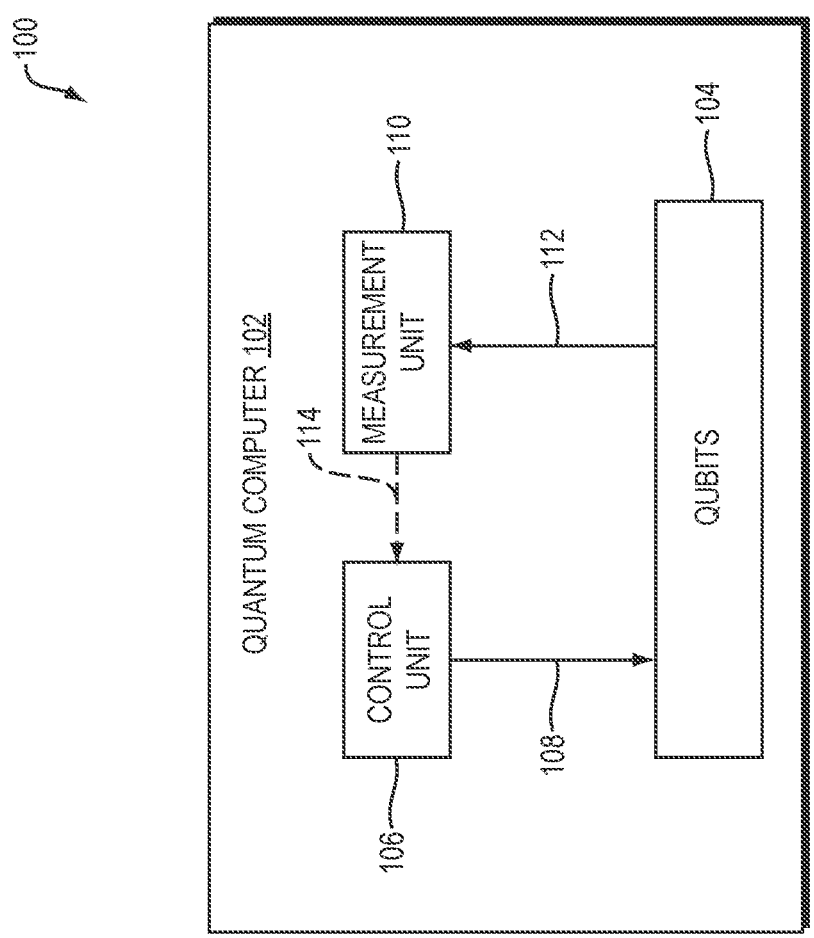
FIG. 1 is a diagram of a system implemented according to one embodiment of the present invention.

Embodiments of the present invention are directed to a method for utilizing a quantum-classical computer as a generator for adversarial examples. In one embodiment, a method comprises training a classical noise generator whose input includes an output of a quantum generator. To train the classical noise generator which creates adversarial examples, the training may include first sampling from the data set to produce a sample with a corresponding label (many such samples/label combinations may be used sequentially to improve the generator further). The output of the classical noise generator, which includes data from a quantum generator and the sample, produces a noisy example based on the output of the classical noise generator and the sample (e.g., by directly adding the noise to the sample). This noisy example is given as input to the classifier, and the classical noise generator is updated to maximize the difference between the classifier's label of the sample and some other incorrect label coming from the noisy example being processed through the classifier.

Quantum computers offer a potential alternative method for securing AI against adversarial attack. Recently, Google's quantum supremacy experiment demonstrated that it is possible even today to produce distributions which are qualitatively different from those produced classically. This suggests the potential for quantum computers to increase the robustness or exploit potential vulnerabilities of neural networks. Embodiments of the present invention utilize a quantum Boltzmann machine (QBM) to generate adversarial images.

Classical Boltzmann machines are an older neural network generative model whose training goal is to minimize an energy function based on an Ising model. Through training via simulated annealing on a target data distribution, a Boltzmann machine gradually decreases in temperature until it reaches thermal equilibrium. The resulting model can then be sampled to produce examples of the desired data. Classical Boltzmann machines do not see much practical use, however, because of the inherent difficulty in training the underlying distribution—the training time being exponential in the number of nodes of the neural network.

Quantum Boltzmann machines offer a potential method to ameliorate the exponential training time of such models by encoding the energy function in a quantum system Hamiltonian on a quantum device (i.e. a quantum computer or quantum annealer) and minimizing a loss function through repeated measurements on the device.

Theoretical simulations of small QBMs have been tested both in direct comparison to classical randomized Boltzmann machines (note that "RBMs" are instances of Boltzmann machines whose hidden units and visible units form a bipartition) and as a means of augmenting existing classical machine learning tools. In the latter case, the QBM is used as the latent space model in an associative adversarial network (AAN).

The motivation for using a QBM in a hybrid quantum-classical network such as an AAN is to maximize the utility of a small quantum computer. Because quantum computers lack the memory necessary to handle tasks such as image recognition, they are ill-suited to replace an entire neural network. Using a QBM as a generative model for the latent space representation allows the quantum computer to maximize the efficiency of its memory.

A quantum hybrid model that aims at giving a functionally different behavior than classical adversarial models is now described. Although the following description refers to the classification task as image classification, this is merely an example and not a limitation of the present invention. Embodiments of the present invention may be applied to classification tasks other than image classification.

Embodiments of the present invention include generating a set of data that can fool a classical classifier (note that this may include either classifier models which have not been trained against adversarial images, or ones that have). The protocol, which may include three steps, is a model for addressing the black box setting, where the target classifier is inaccessible to the attacker. In some embodiments, the set of data is a set of images; we will assume this for simplicity for the remainder of the specification, even though this is not a limitation of the present invention.

In the first step, a typical black box attack begins with training a substitute classifier—a classifier that is trained by the attacker to replicate the behavior of the target classifier. In some embodiments, the substitute classifier is the same type of classifier as the target classifier. In some embodiments, the substitute classifier is a different type than the target classifier, or the target classifier is unknown.

In the second step, a quantum generator is trained by sampling a layer of the substitute classifier. In some embodiments, the quantum generator is a QBM; we will assume this for simplicity for the remainder of the specification. It is trained by sampling from and training to capture a layer of the substitute classifier. In some embodiments, the second-to-last layer of the classifier will be used since it contains the information of the classification. The resulting QBM will be capable of generating samples from the space of images and classifications from the substitute classifier.

In the final step of the model, the QBM is fed into a classical generator. This generator provides the source of randomness for adversarial noise, which is added to an image and fed into the substitute classifier. Using gradient ascent, or some other equivalent method, the classical generator can then be optimized so that misclassification occurs at the output of the substitute classifier.

Once the entire neural protocol has been trained, the task is to compare the classification accuracy between adversarial images generated by a classical adversarial AI and the QBM-enhanced adversarial AI.

Training a QBM is a non-trivial task for quantum computers. The goal is to implement time evolution e^(−iHt) with Hamiltonian H describing a set of spins interacting in a bipartite graph $$H = \sum_{i=1}^{n} \sum_{j=1}^{m} J_{ij} Z_i Z_j$$

Here the ZZ coupling may also be replaced by other pairwise couplings, or linear combinations thereof.

Quantum Supremacy experiments suggest that devices on the order of 50+ qubits can deliver capabilities that are post-classical. Such devices would either need significant improvements in noise suppression and qubit control or would need to be implemented on hardware specifically designed for training QBMs.

Until the point that tests can be offloaded directly to quantum hardware, numerical benchmarking can test the relative strengths of various quantum adversarial models, such as the one proposed here. For instance, a QBM network of 13 units (8×3×2×1) is already able to demonstrate a pronounced improvement over an RBM of the same architecture. Collection of these benchmarks will allow a concrete roadmap to be realized to first explore the potential for quantum adversarial AI, and second, for its exploitation in production AI.

Figure 4:
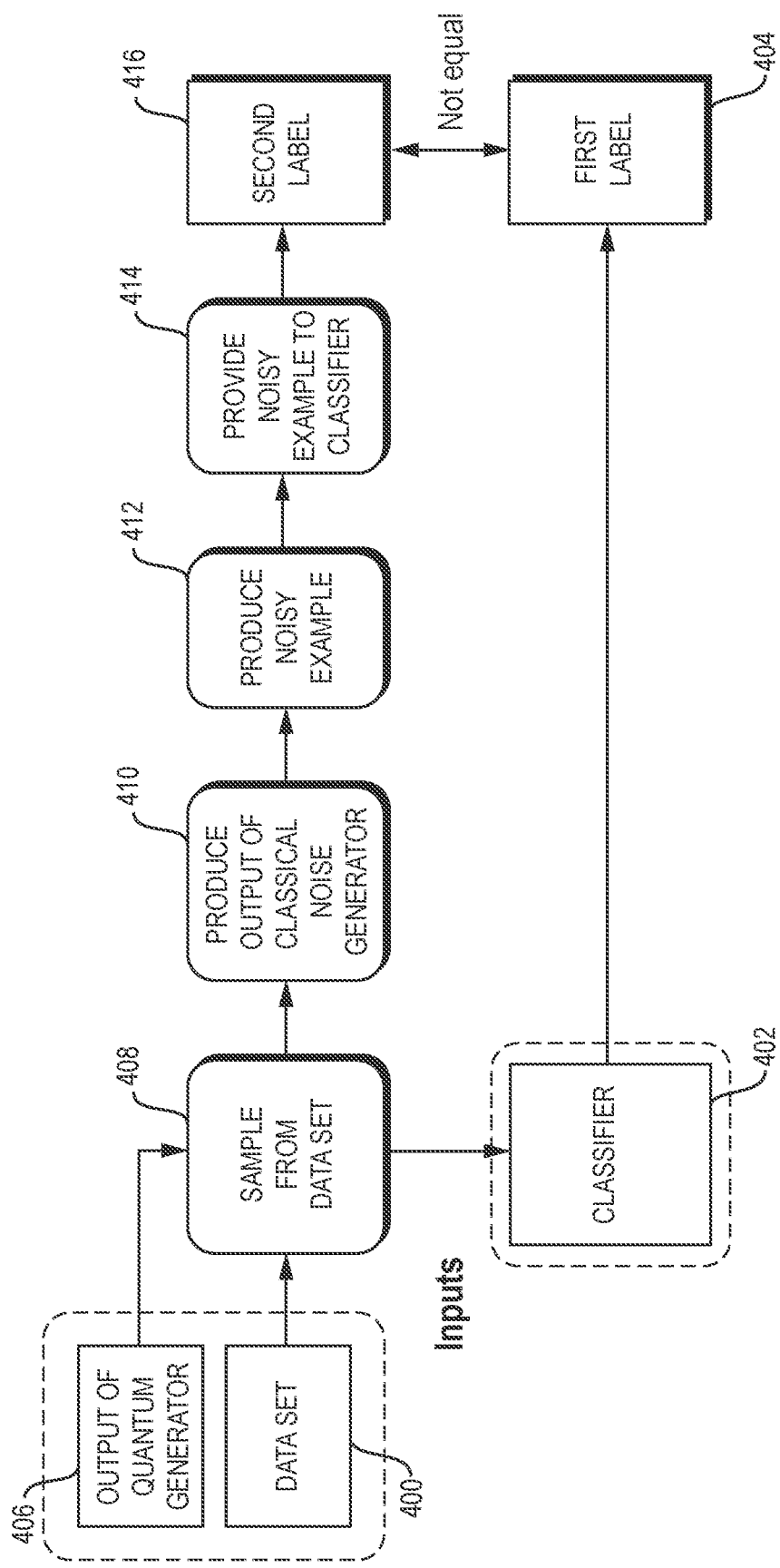
FIG. 4 is a flowchart of a method performed by embodiments of the present invention to train an adversarial generator.
Figure 5:
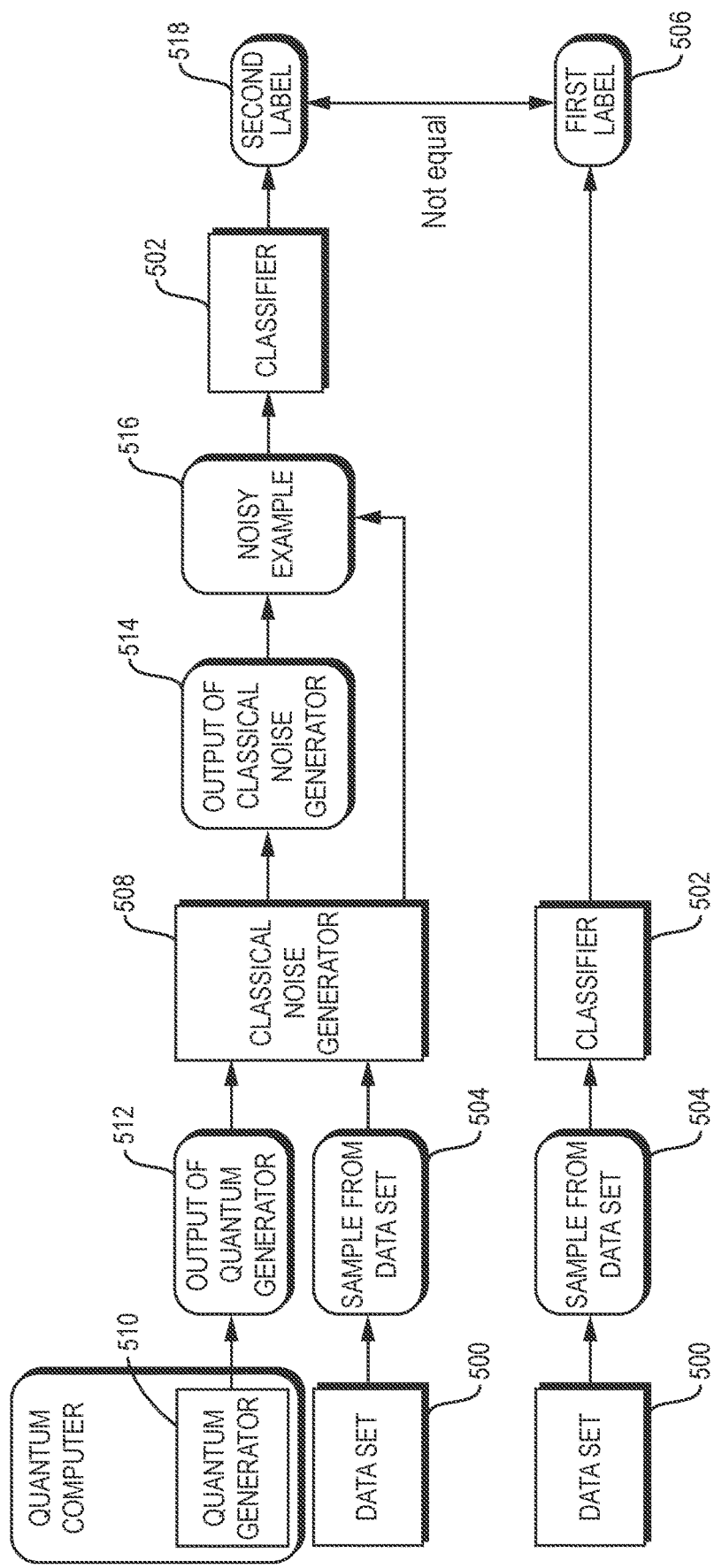
FIG. 5 is a dataflow diagram of a system implemented according to one embodiment of the present invention.

FIG. 4 is a flowchart of a method performed by embodiments of the present invention to train an adversarial generator from a data set 400/500 and a classifier 402. FIG. 5 is a dataflow diagram of a system implemented according to one embodiment of the present invention for performing the method of FIG. 4.

The method includes: (A) training a classical noise generator 508, whose input includes an output 406/512 of a quantum generator 510. The classical noise generator 508 has a first set of parameters.

The training includes: (A)(1) sampling 408 from the data set 400/500 to produce a first sample 504 and a first corresponding label 404/506 for the first sample 504; (A)(2) producing 410 an output 514 of the classical noise generator based on the output 406/512 of the quantum generator 510 and the first sample 504; (A)(3) producing 412 a noisy example 516 based on the output 514 of the classical noise generator 508 and the first sample 504; (A)(4) providing 414 the noisy example 516 to the classifier 402/502 to produce a second corresponding label 416/518 for the first sample 504; and (A)(5) updating (e.g., at the classifier 502) the first set of parameters such that the first corresponding label 404/506 of the first sample differs from the second corresponding label 416/518 of the first sample.

The method may further include, before (A): (B) training an initial sample generator on a hybrid quantum-classical computer to produce the output 406/512 of the quantum generator 510. The initial sample generator may have a second set of parameters. The hybrid quantum-classical computer may include a classical computer and a quantum computer. The quantum computer may include the initial sample generator. The training may include: (B)(1) sampling, on the classical computer, from the classifier 402/502 to produce a second sample; and (B)(2) updating, on the quantum computer, the second set of parameters based on the second sample to produce the quantum generator 510.

The method may further include: (C) after (B) and before (A), sampling from the quantum generator 510 to produce the output 406/512 of the quantum generator 510.

The initial sample generator may include a quantum Boltzmann machine. The data set may include a collection of images.

Another embodiment is directed to a system for training an adversarial generator from the data set 400/500 and the classifier 402/502. The system includes at least one non-transitory computer-readable medium having computer program instructions stored thereon. The computer program instructions are executable by at least one computer processor to perform a method. The method includes: (A) training a classical noise generator 508, whose input includes an output 406/512 of a quantum generator 510. The classical noise generator 508 has a first set of parameters.

The training includes: (A)(1) sampling 408 from the data set 400/500 to produce a first sample 504 and a first corresponding label 404/506 for the first sample 504; (A)(2) producing 410 an output 514 of the classical noise generator based on the output 406/512 of the quantum generator 510 and the first sample 504; (A)(3) producing 412 a noisy example 516 based on the output 514 of the classical noise generator 508 and the first sample 504; (A)(4) providing 414 the noisy example 516 to the classifier 402/502 to produce a second corresponding label 416/518 for the first sample 504; and (A)(5) updating (e.g., at the classifier 502) the first set of parameters such that the first corresponding label 404/506 of the first sample differs from the second corresponding label 416/518 of the first sample.

The system may further include a classical computer and a quantum computer. The classical computer may include the at least one non-transitory computer-readable medium. The method may further include, before (A): (B) training an initial sample generator on a hybrid quantum-classical computer to produce the output 406/512 of the quantum generator 510. The initial sample generator may have a second set of parameters. The hybrid quantum-classical computer may include the classical computer and the quantum computer. The quantum computer may include the initial sample generator. The training may include: (B)(1) sampling, on the classical computer, from the classifier 402/502 to produce a second sample; and (B)(2) updating, on the quantum computer, the second set of parameters based on the second sample to produce the quantum generator 510.

The method performed by the system may further include: (C) after (B) and before (A), sampling from the quantum generator 510 to produce the output 406/512 of the quantum generator 510.

The initial sample generator may include a quantum Boltzmann machine. The data set may include a collection of images.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
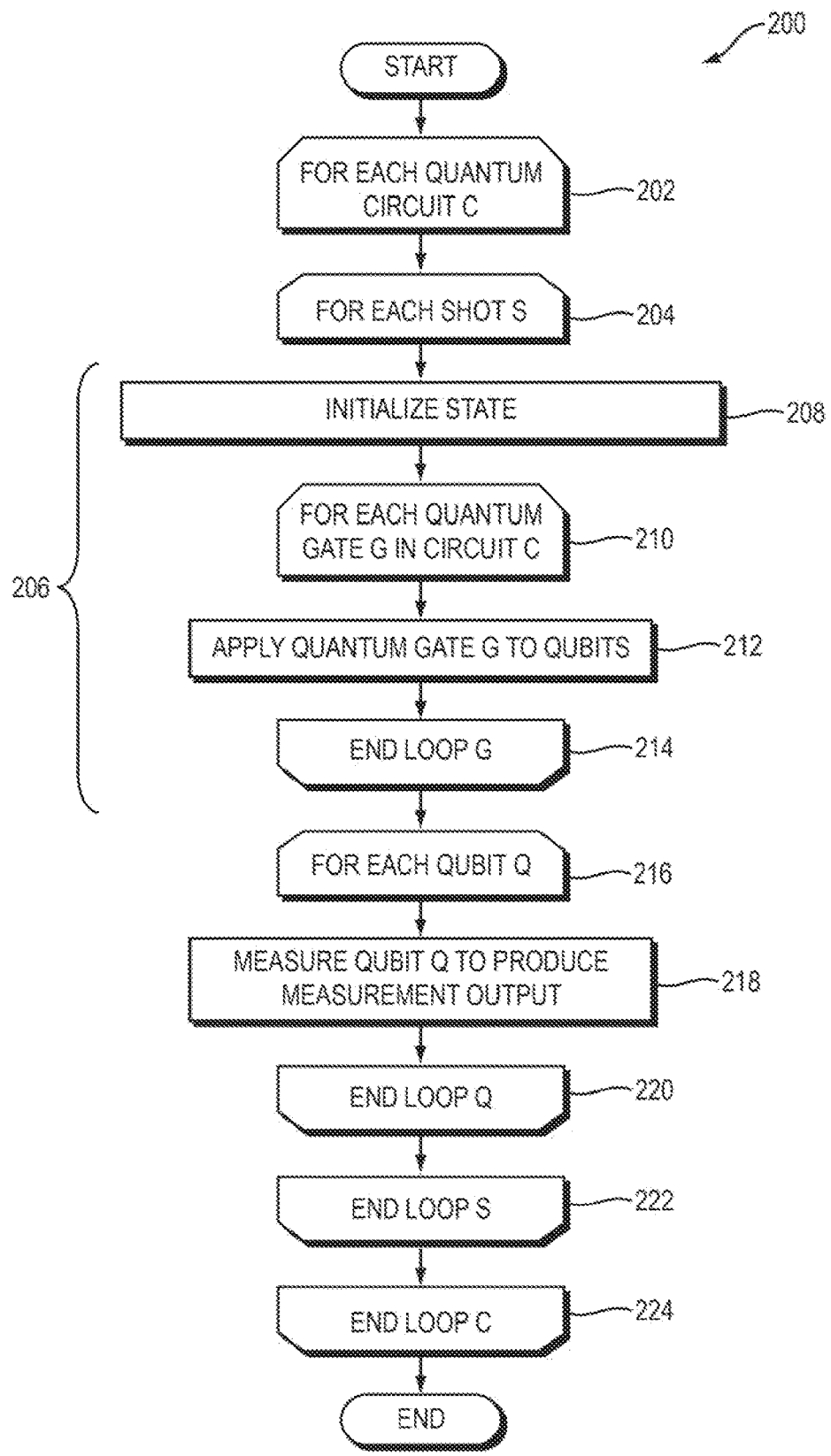
FIG. 2A is a flow chart of a method performed by the system of FIG. 1 according to one embodiment of the present invention.
Figure 2B:
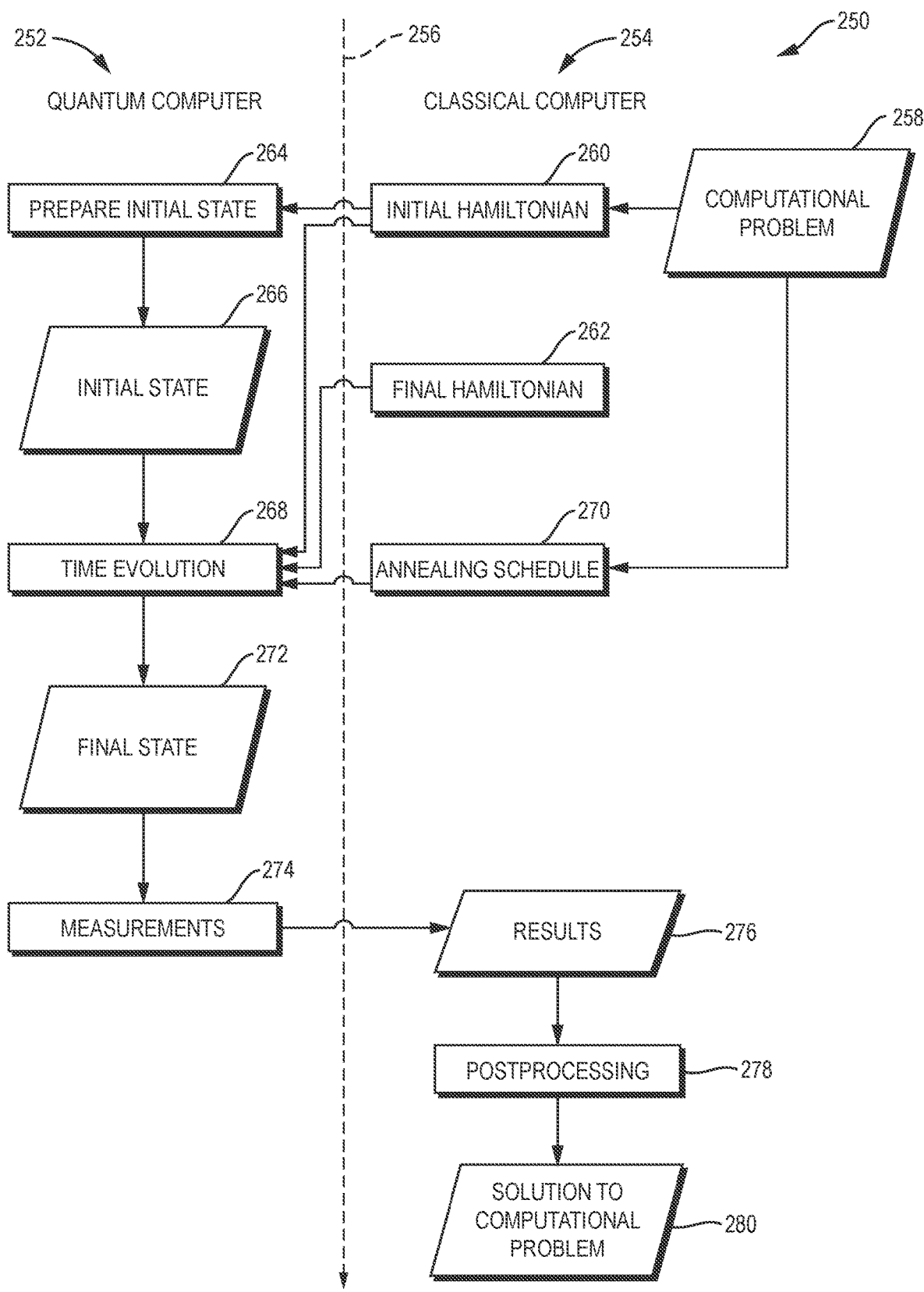
FIG. 2B is a diagram illustrating operations typically performed by a computer system which implements quantum annealing.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general, the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments, the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:
- In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.
- In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.
- In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.
- In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.
- In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.
- In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signals 114 from the measurement unit 110 to the control unit 106. Such feedback signals 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. W and X as elements of "state preparation" may instead be characterized as elements of gate application. Conversely, for example, some or all of the components and operations that are illustrated in FIGS. W and X as elements of "gate application" may instead be characterized as elements of state preparation. As one particular example, the system and method of FIGS. W and X may be characterized as solely performing state preparation followed by measurement, without any gate application, where the elements that are described herein as being part of gate application are instead considered to be part of state preparation. Conversely, for example, the system and method of FIGS. W and X may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
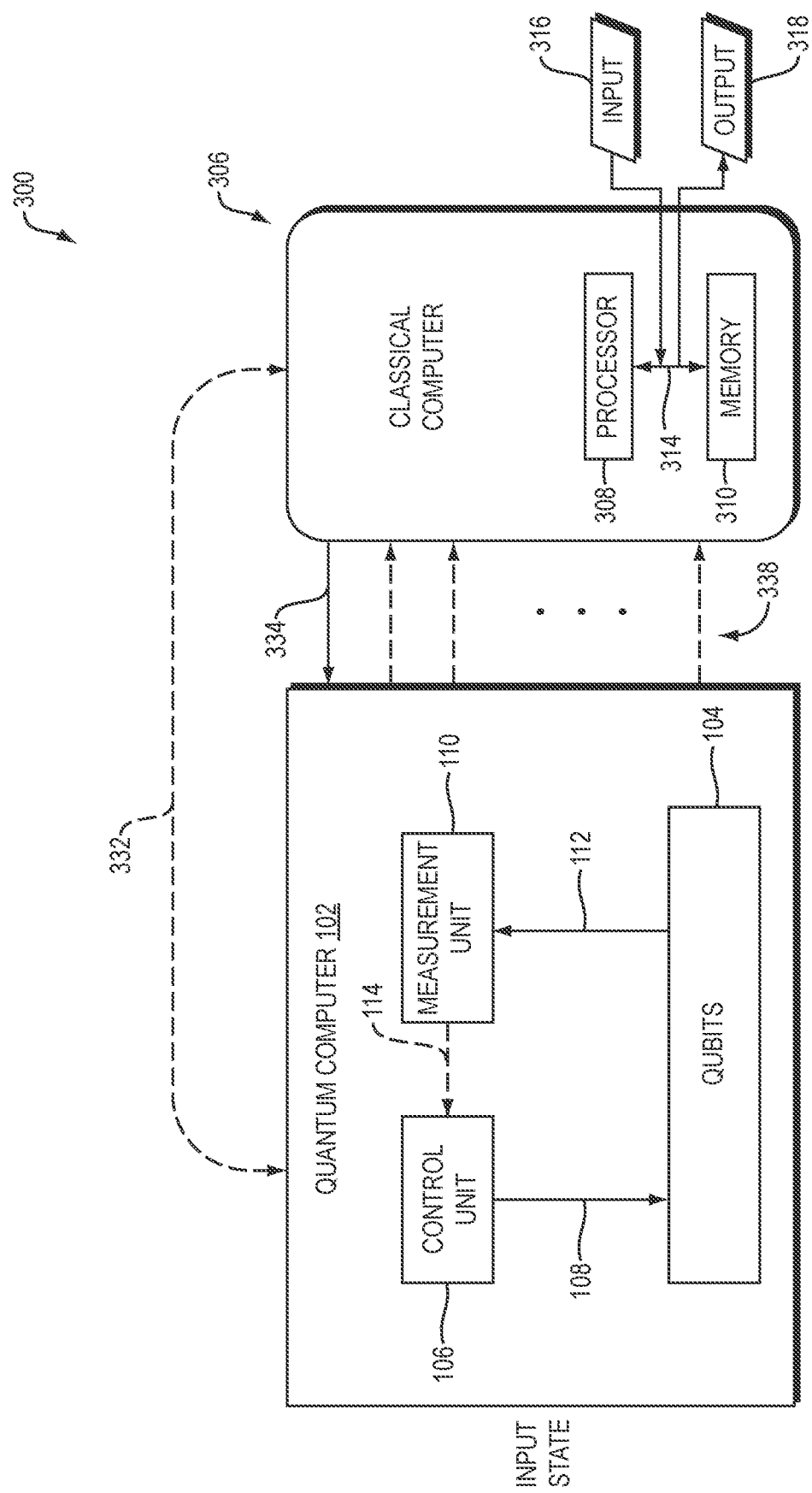
FIG. 3 is a diagram of a hybrid quantum-classical computer system implemented according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. W and X) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, tuning a quantum evolution, as performed by embodiments of the present invention, is not possible for a human to perform mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random-access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure (s).

What is claimed is:

1. A method for training an adversarial generator from a data set and a classifier, the method comprising:
   (A) training a classical noise generator whose input includes an output of a quantum generator, the classical noise generator having a first set of parameters, the training comprising:
   (A) (1) sampling from the data set to produce a first sample $\vec{x}$ and a first corresponding label for the first sample $\vec{x}$,
   (A) (2) producing an output $\vec{n}$ of the classical noise generator based on the output of the quantum generator and the first sample,
   (A) (3) producing a noisy example $\vec{x}+\vec{n}$, comprising adding the output $\vec{n}$ of the classical noise generator to the first sample $\vec{x}$,
   (A) (4) providing the noisy example $\vec{x}+\vec{n}$ to the classifier to produce a second corresponding label for the first sample $\vec{x}$,
   (A) (5) updating the first set of parameters such that the first corresponding label of the first sample $\vec{x}$ differs from the second corresponding label of the first sample $\vec{x}$.

2. The method of claim 1, further comprising:
   (B) before (A), training an initial sample generator on a hybrid quantum-classical computer to produce the output of the quantum generator, the initial sample generator having a second set of parameters, the hybrid quantum-classical computer including a classical computer and a quantum computer, the quantum computer including the initial sample generator, the training comprising:
   (B) (1) sampling, on the classical computer, from the classifier to produce a second sample;
   (B) (2) updating, on the quantum computer, the second set of parameters based on the second sample to produce the quantum generator.

3. The method of claim 2, further comprising:
   (C) after (B) and before (A), sampling from the quantum generator to produce the output of the quantum generator.

4. The method of claim 2, wherein the initial sample generator comprises a quantum Boltzmann machine.

5. The method of claim 1, wherein the data set comprises a collection of images.

6. A system for training an adversarial generator from a data set and a classifier, the system comprising at least one non-transitory computer-readable medium having computer program instructions stored thereon, the computer program instructions being executable by at least one computer processor to perform a method, the method comprising:
   (A) training a classical noise generator whose input includes an output of a quantum generator, the classical noise generator having a first set of parameters, the training comprising:

(A) (1) sampling from the data set to produce a first sample $\vec{x}$ and a first corresponding label for the first sample $\vec{x}$, (A) (2) producing an output $\vec{n}$ of the classical noise generator based on the output of the quantum generator and the first sample, (A) (3) producing a noisy example $\vec{x}+\vec{n}$, comprising adding the output $\vec{n}$ of the classical noise generator to the first sample $\vec{x}$, (A) (4) providing the noisy example $\vec{x}+\vec{n}$ to the classifier to produce a second corresponding label for the first sample $\vec{x}$, (A) (5) updating the first set of parameters such that the first corresponding label of the first sample $\vec{x}$ differs from the second corresponding label of the first sample $\vec{x}$.

7. The system of claim 6, further comprising a classical computer and a quantum computer, the classical computer including the at least one computer processor and the at least one non-transitory computer-readable medium, the method further comprising:

(B) before (A), training an initial sample generator on a hybrid quantum-classical computer to produce the output of the quantum generator, the initial sample generator having a second set of parameters, the hybrid quantum-classical computer including a classical computer and a quantum computer, the quantum computer including the initial sample generator, the training comprising:

(B) (1) sampling, on the classical computer, from the classifier to produce a second sample;

(B) (2) updating, on the quantum computer, the second set of parameters based on the second sample to produce the quantum generator.

8. The system of claim 7, wherein the method further comprises:

(C) after (B) and before (A), sampling from the quantum generator to produce the output of the quantum generator.

9. The system of claim 7, wherein the initial sample generator comprises a quantum Boltzmann machine.

10. The system of claim 6, wherein the data set comprises a collection of images.

* * * * *